United States Patent [19]

Beck et al.

[11] 4,406,108
[45] Sep. 27, 1983

[54] METHOD FOR INSTALLING A SUSPENDED CEILING

[75] Inventors: Martin J. Beck, Boxford; George F. W. Boesel, Canton, both of Mass.

[73] Assignee: Armstrong World Industries, Inc., Lancaster, Pa.

[21] Appl. No.: 245,980

[22] Filed: Mar. 20, 1981

[51] Int. Cl.³ .................................................. G09F 7/18
[52] U.S. Cl. ........................................ 52/741; 52/39; 52/698; 411/340; 411/346
[58] Field of Search ............... 52/39, 484, 747, 698, 52/741; 411/340–346, 446; 248/71

[56] References Cited

U.S. PATENT DOCUMENTS 4,196,883  4/1980  Einhorn .................... 411/340 X

Primary Examiner—Carl D. Friedman

[57] ABSTRACT

A suspended ceiling is installed in position by the use of a special nail construction. The nail has a pivotally mounted end which will maintain its straight configuration when it is being driven into a solid ceiling material. Should the nail be driven into a hollow ceiling material, the end of the nail will be permitted to pivot within the hollow area and the end of the nail then functions as a retainer to hold the nail in position in the ceiling material so that the suspended ceiling may be suspended from the retained nail.

2 Claims, 2 Drawing Figures

METHOD FOR INSTALLING A SUSPENDED CEILING

BACKGROUND OF THE INVENTION

1. Field of the Invention

The invention is directed to a technique for mounting a suspended ceiling in position and, more specifically, is directed to the utilization of a specific nail structure to permit a nail to be retained in a ceiling that has a hollow cavity therebehind.

2. Description of the Prior Art

U.S. Pat. No. 427,317 is directed to a nail structure similar in construction to that of the nail shown herein. This nail structure has a pivoted head rather than a pivoted front end and is not meant to be driven into hollow wall structures.

U.S. Pat. No. 1,990,289 is directed to a cork screw that has a pivoted end which will pivot to retain the corkscrew in position. There is no teaching of utilizing the corkscrew of that patent to mount a suspended ceiling in position.

SUMMARY OF THE INVENTION

The invention is directed to a method of installing a suspended ceiling utilizing a pivoted nail structure. The nail structure has a body portion with an enlarged head containing an aperture fastened to one end of the body. The body of the nail is formed as a long section and a short section and the pivot between the two sections is adjacent the end of the body opposite from that of the enlarged head. A collar means is slidably positioned on the body of the nail and keeps the nail from pivoting into its two sections when the collar is held in its first position. The collar is movable to a second position wherein the two sections of the body of the nail are now permitted to pivot relative to each other. The nail, with the collar in position to prevent pivoting, is driven into a ceiling to a point where the collar is shifted from over the pivot point of the nail sections and the nail sections are capable of pivoting if the nail passes into a hollow area behind the ceiling. If the nail passes into an area behind the ceiling where there is a stud, the ceiling and stud structure will retain the nail in an axial alignment and prevent the two sections of the nail from pivoting. However, if the nail pops into a hollow area, the short section of the nail will pivot with regard to the long section of the nail and will dispose itself at a 90° angular relationship to the long section of the nail. When the nail enters a hollow area, the nail is then initially pushed up into the hollow cavity to let the short section of the nail pivot and then the nail is pulled back down in the direction to withdraw it from the ceiling so that the short section of the nail will wedge against the backside of the ceiling to prevent complete withdrawal of the nail from the ceiling. A suspended ceiling system would then be mounted in part relative to the aperture on the enlarged head of the nail.

DESCRIPTION OF THE PREFERRED EMBODIMENT

Figure 1:
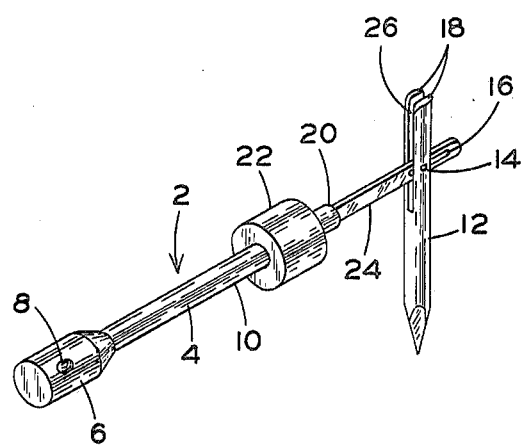
FIG. 1 is a perspective view of the nail structure herein.

The nail structure 2 used in the invention herein is shown in FIG. 1. The nail has a body portion 4 and on one end of the body portion, there is positioned an enlarged head 6 having an aperture 8 therein. The body portion of the nail is actually composed of a long section 10 and a short section 12 which are pivoted together by pivot pin 14. The short section of the nail has a hole therein through which the pivot pin passes and snugly fits. The long section of the nail has an elongated aperture 16 through which the pivot pin 14 passes. The elongated aperture is positioned so that when the nail has both sections in axial alignment, the shoulders 18 on the back of the short section of the nail will engage the shoulders 20 on the long section of the nail so that any driving force applied to the elongated head 6 will be transmitted from the head 6 through the long body section 10 through the shoulders 18 and 20 to the short section 12. However, should the nail not have the two sections retained in alignment, the elongated aperture 16 will let the pivot pin 14 shift slightly away from the end of the long body section 10 and this will release shoulder 18 from shoulder 20 and permit the short section 12 to pivot to approximate a 90° position relative to the long section 10. In effect, the short section 12 functions as the end of a toggle bolt which will hold a bolt in position against a plaster wall that has a cavity therebehind. The collar 22 can be used to hold the short section and long section of the nail in position by having the collar positioned beyond shoulders 18 and 20 in the region 24 of the long section of the nail. The region 24 of the long section of the nail slips into a slot 26 in the short section of the nail and, when these two sections of nails are placed in axial alignment, the collar can be put in position to retain the two nail sections in alignment.

Figure 2:
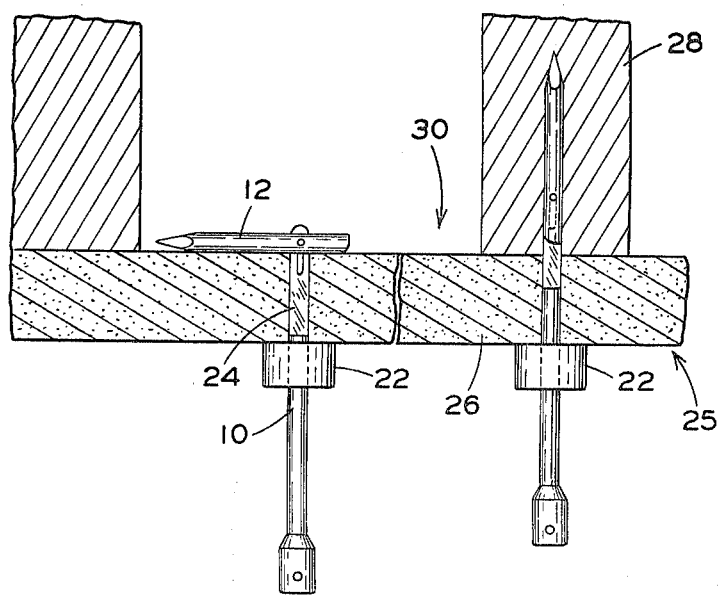
FIG. 2 is a showing of the nail structure in its two modes of operation for the purpose of functioning as a means for supporting a suspended ceiling.

In carrying out the method of the invention herein, one would be driving a nail into a ceiling 24 which would be probably a plaster covering 26 mounted on a series of space studs 28 and between the studs there would be hollow areas 30. Should the nail be positioned so that it would drive directly through the plastered wall 26 into the stud 28, the nail will be retained straight by the confining action of the nail hole in the plastered wall and the stud. Even though the collar 22 would slide off region 24, the two sections of the nail would be preventing from pivoting because they would be retained in the hole being placed through the plastered wall 26 and the stud 28. Therefore, the nail would be driven straight into position like a conventional nail and would be securely retained in position because it would be driven into the stud element 28 (Right side, FIG. 2). However, looking at the left side of FIG. 2, there is shown the situation which exists when the nail is driven into a section of plastered wall 28 which has cavity 30 therebehind. Driving the nail on the left-hand side of FIG. 2 through the plastered wall 26 will have the collar 22 driven back from the mid-region 24 and the collar is no longer retaining the two sections of the nail in alignment. For a short while, the plaster wall 26 may hold the two sections in alignment, but as soon as the nail penetrates into cavity 30, it will then move rapidly into the cavity and the cavity will provide no retaining section on the two sections of the nail. Consequently, short section 12 will pivot relative to long section 10 and the two sections will be disposed at approximately a 90° angular relationship. Then pulling downward in the direction of the arrow 30 will pull the short section 12 down against the back of the ceiling 26 and thus retain the nail in position in the same manner that a toggle bolt is retained in position in a hollow wall. A hanger wire for a conventional suspended ceiling system would then be passed through aperture 8 and used to support the runner elements of a suspended ceiling system.

What is claimed is:

1. A method of installing a suspended ceiling using a pivoting nail structure, said nail structure having a body portion with an enlarged head containing an aperture, said head fastened to one end of said body, the body of said nail being in the form of a short section and a long section, both sections being pivoted to each other adjacent the other end of the body, a collar slidably positioned on the body of the nail and movable from a first position wherein the two sections of the body cannot be pivoted and the two body sections are in axial alignment, said collar means being slidably positioned to a second position wherein the two body sections will pivot relative to each other so that the short body section can be disposed at a 90° angular relationship to the long body section, the steps comprising:

(a) positioning the collar means in said first position over the point where the two sections are pivoted to keep the two sections of the nail in axial alignment,
   (b) driving the nail into a ceiling to a point beyond the pivot point of the nail until the pivot point has passed beyond the lower surface of the ceiling and the collar is pushed by the surface of the ceiling to the second position and the collar is held against the surface of the ceiling, said ceiling now holding the two sections of the nail in axial alignment,
   (c) should the nail now not be passing through solid ceiling material, but has passed into a hollow area in the ceiling, then pushing the nail into the hollow area beyond the ceiling until the short section of the nail is free from the ceiling and will pivot with regard to the long section of the nail and be disposed at a 90° angular relationship to the long section,
   (d) pulling on the nail in the direction to withdraw the nail from the ceiling whereby the short section of the nail will encounter the back of the ceiling and prevent the withdrawal of the nail, and
   (e) suspending a portion of a ceiling from the aperture in the enlarged head of the nail.

2. A method of installing a suspended ceiling using a pivoting nail structure as set forth in claim 1 including the step of:

(a) should the nail not pass into a hollow area in the ceiling but be capable of being driven into solid material of the ceiling, then driving the nail into the ceiling until the nail is driven beyond its midpoint into the surface of the ceiling whereby the nail will be capable of being retained in position in the ceiling, and
   (b) suspending a part of the ceiling from the aperture in the enlarged head of that nail now solidly fastened in the ceiling.

* * * * *